April 16, 1929.  C. A. PERSONS  1,709,538
TANDEM ATTACHMENT FOR MOTOR CYCLES
Filed Oct. 11, 1926
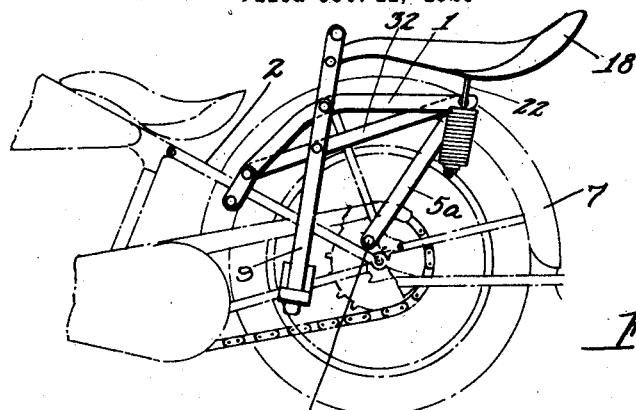
Fig.1.
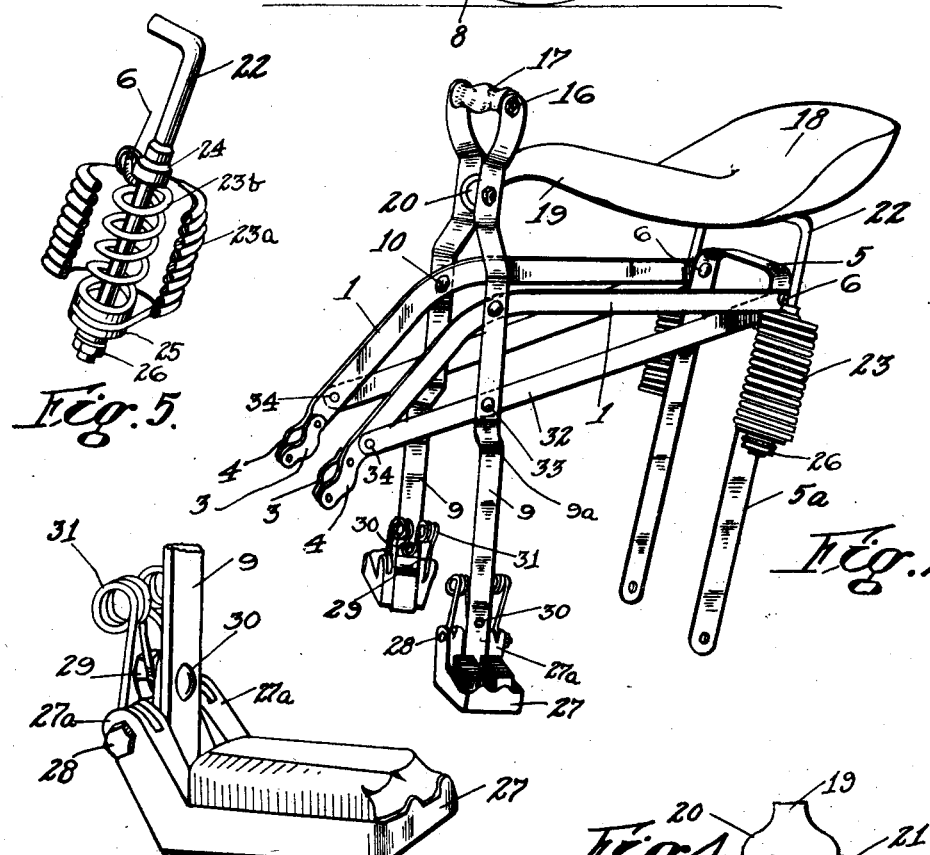
Fig.5.
Fig.2.
Fig.3.
Fig.4.
Inventor:
Charles A. Persons
By Owen W. Kennedy
Attorney Patented Apr. 16, 1929.

1,709,538

UNITED STATES PATENT OFFICE.

CHARLES A. PERSONS, OF WORCESTER, MASSACHUSETTS, ASSIGNOR TO PERSONS-MAJESTIC MANUFACTURING COMPANY, OF WORCESTER, MASSACHUSETTS, A CORPORATION OF MASSACHUSETTS.

TANDEM ATTACHMENT FOR MOTOR CYCLES.

Application filed October 11, 1926. Serial No. 140,919.

The present invention relates to a tandem attachment for motor cycles which is adapted to provide a safe and easy riding seat for the passenger in the rear of the usual driver's seat.

My improved tandem attachment is so constructed that it may be quickly applied to a motor cycle, the several parts of the attachment being so connected and braced that the tandem seat will be able to safely carry any load to which it is subjected. The improved attachment is adapted to afford a maximum degree of comfort for the tandem rider, by allowing an easy position for the rider's knees and by the provision of an improved hand grip for the tandem rider. The above and other advantageous features of my invention will hereinafter more fully appear, reference being had to the accompanying drawings, in which Fig. 1 is a view in side elevation illustrating a portion of a motor cycle provided with my improved tandem attachment.

Fig. 2 is a perspective view of the attachment shown in Fig. 1, removed from the motor cycle.

Fig. 3 is a fragmentary perspective view showing the mounting of the foot pedals on an enlarged scale.

Fig. 4 is a fragmentary plan view showing the pivotal attachment of the saddle.

Fig. 5 is a detail view of the spring structure.

Like reference characters refer to like parts in the different figures.

Referring to the drawings, the attachment comprises a pair of side bars 1, 1, identical in form, one end of each side bar 1 being connected to an inclined frame member 2 of the motor cycle. As shown in Fig. 2, the attachment of a bar 1 to a frame member 2 of the motor cycle is by means of a clip 3 embracing the member 2 and coacting with a clip portion 4 formed at the end of the bar 1. The clip portions 4 are slightly angled with respect to the remainder of the bars 1, so as to enable the bars 1 to be readily fitted to the frame members 2 where the latter converge toward their lower ends.

The side bars 1, 1, extend rearwardly from the frame members 2, 2, in parallel relation and are secured at their other ends to the upper portion of a saddle yoke 5 by means of bolts 6. The yoke 5 is adapted to embrace the rear mudguard 7 of the motor cycle with its spaced arms 5ª extending downwardly to a point where they are connected by bolts 8 to the rear fork of the motor cycle frame. The tandem attachment also comprises a pair of uprights 9, 9, which are connected intermediate their ends to the side bars 1, 1, by means of bolts 10. The upper portions of the uprights 9 are bent toward each other near their upper ends by easy curves, at 9ª, and are secured together in spaced relation by means of a bushing 14 through which passes a bolt 15. See Fig. 4. The upper ends of the uprights 9 above the bushing 14 are connected by means of a through-bolt 16 which is surrounded by a tubular handle or grip 17, preferably in the form of a rubber tube covering a wooden bushing. The grip 17 is of sufficient width to receive both hands of the rear rider when the latter is seated in the saddle 18, the mounting of which will now be described.

The saddle 18 may be of any desired type, and as shown is provided with an elongated pommel 19 which terminates in a fork portion 20, as shown in Fig. 4. The arms of the fork portion 20 are provided with alined openings for receiving the spacing bushing 14 which separates the uprights 9 as previously described. The bushing 14 is slightly greater in length than the width of the pommel fork 20, so that the saddle 18 may pivot freely on the bushing 14 even when the uprights 9 are drawn tightly against the ends of the bushing 14 by the nut 21 on the bolt 15. The rear of the seat 18 is supported by an arch 22, the sides of which extend downwardly within compound supporting springs 23.

As best shown in Fig. 5, each spring 23 is of the compound type with the upper looped end of its outer coil 23ª secured to the yoke 5 by the same bolt 6 which secures the side bar 1 thereto, while the inner spring 23ᵇ is adapted to receive the weight of the saddle 18 from a shoulder 24 provided on the arch 22. The lower end of each inner spring 23ᵇ rests on a bushing 25 which is held at the lower end of the arch arm by means of a nut 26, with the lower end of spring 23ª attached thereto; thus, the weight of the rider passes through the inner compression springs 23ᵇ before being transmitted to the outer tension springs 23ª, whereby vibration and rebound of the saddle 19 is substantially eliminated.

The pedal construction is shown in Fig. 3, each pedal 27 being pivotally connected to the lower end of an upright 9 by means of a bolt 28 passing through ears 27ª provided by the pedal 27. The bolt 28 passes through a bracket 29 secured to the upright 9 by means of a bolt 30, the bolt 30 also serving to hold the middle portion of a pedal spring 31. The ends of the pedal spring 31 press on the extended ears 27ª of the pedal 27 so as to tend to hold the pedal 26 either extended, or in its upper position when the pedal has been turned about its pivot pin 28 to move it to the desired position.

For the purpose of stiffening the whole attachment, cross braces 32 are provided which extend below the side bars 1. The braces 32 are connected intermediate their ends to the uprights 9 by means of bolts 33, while the opposite ends of the braces 32 are connected to the side bars 1 by means of the bolts 34 at one end, and by means of the yoke bolts 6 at the other end. It is evident that the braces 32 will add considerable rigidity to the complete frame of the attachment, inasmuch as each brace 32 forms with the divergent portions of the connected bar 1, two complete triangles.

From the foregoing, it is apparent that by my invention I have provided an improved tandem attachment which may be readily applied to the frame of a motor cycle and which is particularly characterized by the comfortable seating of the tandem rider. The easy curves of the uprights 9 allow the knees of the rider to set in snugly while the rubber grip 17 can be firmly grasped by the rider's hands. Furthermore, the seat is supported so that it will safely carry any load to which it may be subjected, the compound springs which receive the weight of the saddle serving to substantially eliminate vibration and rebound.

I claim:

1. A tandem attachment for motor cycles comprising a frame made up of side bars provided at their front ends with clip portions angled to fit the upper convergent frame bars of a motor cycle, a yoke connected to the rear ends of said side bars and secured at its lower ends to the fork of the motor cycle, uprights secured to intermediate portions of said side bars carrying between them a sleeve for pivotally supporting the forward end of a saddle yieldingly supported by said yoke and bracing members extending between said uprights and said yoke below said side bars.

2. A tandem attachment for motor cycles comprising a frame made up of side bars provided at their front ends with clip portions angled to fit the upper convergent frame bars of a motor cycle, a yoke connected to the rear ends of said side bars and secured at its lower ends to the fork of the motor cycle, uprights secured to intermediate portions of said side bars carrying between them a sleeve for pivotally supporting the forward end of a saddle yieldingly supported by said yoke and continuous bracing members extending between said yoke, said uprights and the forward ends of said side bars, below said side bars.

Dated October 8, 1926.

CHARLES A. PERSONS.